Aug. 10, 1971   A. J. PETERSEN   3,598,712
ION MEASURING ELECTRODE
Filed Nov. 4, 1968
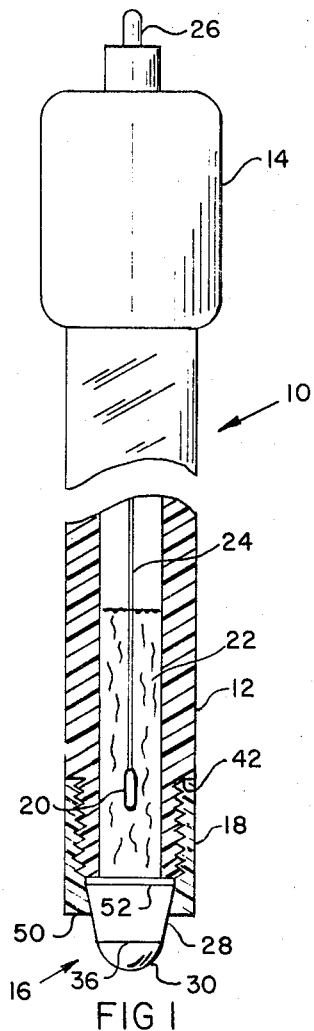
FIG 1
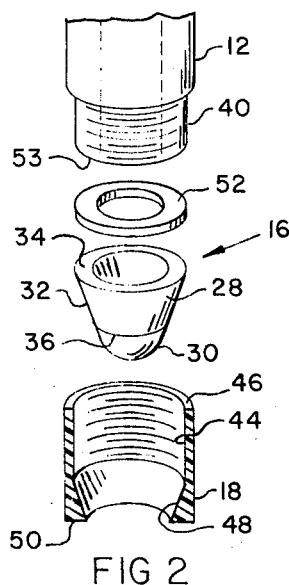
FIG 2
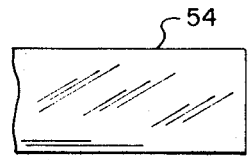
FIG 3A
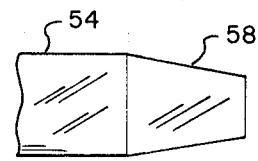
FIG 3B
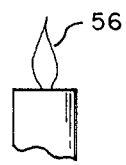
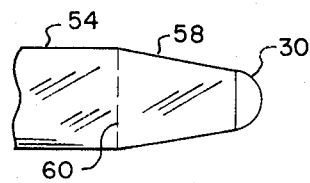
FIG 3C
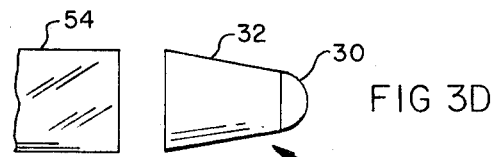
FIG 3D
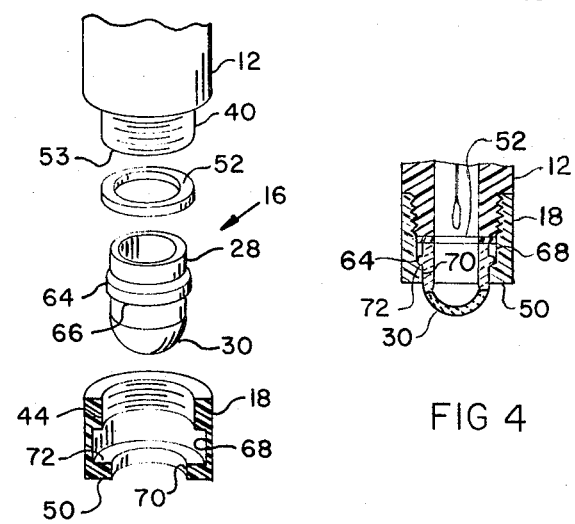
FIG 5   FIG 4
INVENTOR.
ARNE J. PETERSON
BY Thomas L. Peterson
ATTORNEY 3,598,712
ION MEASURING ELECTRODE
Arne J. Petersen, Balboa, Calif., assignor to
Beckman Instruments, Inc.
Filed Nov. 4, 1968, Ser. No. 773,203
Int. Cl. G01n 37/46
U.S. Cl. 204—195                                      6 Claims

ABSTRACT OF THE DISCLOSURE

An ion measuring electrode in which means is provided for replaceably mounting an ion sensitive glass bulb structure on the end of a plastic salt bridge tube of the electrode so that a selected one of a variety of such structures having different glass compositions may be mounted to the tube for making different ion concentration measurements.

BACKGROUND OF THE INVENTION

This invention relates to an electrochemical electrode for making ion concentration measurements and, more particularly, to a new form of such an electrode employing a replaceable ion sensitive glass bulb structure.

Glass electrodes are widely used for measuring the ionic concentration of solutions and commonly comprise an ion sensitive glass barrier, normally in the form of a thin bulb, of low resistance ion sensitive glass blown or otherwise fused to the end of a glass supporting tube having high electrical resistance. Such tube is sometimes referred to as a salt bridge tube or stem. An ionic reference or salt bridge solution fills the lower end of the tube thereby contacting the inner surface of the thin bulb and an internal half cell element is disposed in the tube to contact the ionic solution therein.

While glass electrodes of the above type are in widespread use today, they have the disadvantage that their salt bridge tubes, being formed of glass, are relatively fragile and thus can become broken if the electrodes are dropped or mishandled. In addition, since the ion sensitive bulbs of the electrodes are fused to the glass salt bridge tubes thereof, only a single type of ion concentration measurement may be made by any particular electrode.

SUMMARY OF THE INVENTION

It is the principal object of the present invention to provide an improved ion measuring electrode incorporating a replaceable ion sensitive bulb so that a selected one of a variety of bulbs having different glass compositions may be utilized with a single electrode assembly.

Another object of the invention is to provide an ion measuring electrode having a plastic salt bridge tube with means for replaceably mounting ion sensitive bulbs to the end thereof.

According to the principal aspect of the present invention, there is provided an ion measuring electrode having a structure similar to that of the conventional glass electrode except that the salt bridge tube is formed of plastic, rather than glass, and means is provided for replaceably mounting an ion sensitive glass bulb to the end of the plastic tube. Thus, not only does the electrode have a rugged salt bridge tube which is not subject to breakage as are glass tubes, but also a variety of ion sensitive bulbs may be mounted to the electrode for making different ion concentration measurements, thus avoiding the necessity of providing separate electrode assemblies for each particular ion concentration measurement which is desired to be made.

Other objects, aspects and advantages of the invention will become apparent from the following description taken in connection with the accompanying drawing.

BRIEF DESCRIPTION OF THE DRAWING

FIG. 1 is a partial longitudinal sectional view through the preferred form of the electrode of the present invention incorporating a replaceable ion sensitive glass bulb structure;

FIG. 2 is an exploded, partial sectional view, of the lower end of the electrode illustrated in FIG. 1;

FIGS. 3A, B, C and D show successive steps in formation of the ion sensitive bulb structure employed in the electrode illustrated in FIGS. 1 and 2;

FIG. 4 is a fragmentary longitudinal sectional view of the lower end of a modified form of an electrode made in accordance with the present invention; and FIG. 5 is an exploded, partial sectional view, of the electrode illustrated in FIG. 4.

DESCRIPTION OF THE PREFERRED EMBODIMENTS

Referring now to the drawing in detail, there is illustrated in FIG. 1 the preferred form of the electrode made in accordance with the present invention, generally designated 10. The electrode comprises a stem or salt bridge tube 12 formed of a rugged non-glass material such as the plastics, polyethylene, polypropylene or fluorocarbon, which are chemically inert to prospective test solutions and salt bridge solutions. The tube is closed at its upper end by a cap 14. The lower end of the tube is closed by means of a generally cup-shaped ion sensitive glass bulb structure, generally designated 16, which is replaceably mounted to the end of the tube by means of a cap 18. A suitable internal half cell 20, shown in the form of a silver-silver chloride half cell, is immersed in a salt bridge solution 22 contained in the tube 10. It is understood that other forms of internal half cells could be utilized, if desired, such as a calomel half cell. The conductor 24 of the internal half cell is supported by the cap 14 and connected by means, not shown, to a suitable plug 26 which is adapted to be connected through a cable to a high impedance voltmeter, such as a pH meter, not shown. If desired, a cylindrical electrostatic shield may be imbedded in the plastic tube 12 to shield against capacitive electrical effects outside of the electrode.

The cup-shaped structure 16 comprises a relatively rugged, thick hollow section 28 of non-ion-sensitive glass and a thin bulbous ion sensitive barrier 30. When the structure is mounted to the tube 12 by means of the cap 18, the longitudinal axis of the hollow section 28 is coaxial with the longitudinal axis of the tube as seen in FIG. 1. Preferably the outer surface 32 of the section 28 has a frustoconical configuration so that the upper end 34 of the section provides a major base and the lower end 36 of the section provides a minor base which, as seen, has a diameter less than that of the major base. The ion sensitive barrier 30 is preferably in the form of a hemisphere so that it will have maximum mechanical strength as taught in U.S. Pat. No. 2,756,203 to Gilbert.

The lower end 40 of the tube 12 has a reduced diameter so as to provide a downwardly facing shoulder 42. The cap 18 is provided with an opening extending therethrough which is coaxial with the longitudinal axis of tube 12. This opening includes a first section 44 adjacent to the upper end 46 of the cap and a lower section 48 adjacent to the lower end 50 of the cap. The wall of the opening section 44 of the cap and the outer surface of the end 40 of the salt bridge tube are formed with complementary engageable screw threads which allow rapid assembly and disassembly of the cap to the tube. The wall of the lower section 48 of the opening in the cap has a frustoconical configuration complementary to that of the non-ion-sensitive section 28 of bulb structure 16 so that when the latter is positioned in the cap the mating frustoconical surfaces thereof will engage in sealing relationship.

It is noted that the diameter of the hemispherical bulb 30 is less than the minimum diameter of the frustoconical section 48 of the opening extending through the cap 18. In addition, the longitudinal dimension between the major base 34 and minor base 36 of the non-ion-sensitive section 28 of structure 16 is at least as great, and preferably greater than the longitudinal length of the frustoconical section 48 of the cap, as seen in FIG. 1, so that the minor base 36 extends slightly beyond the end 50 of the cap. By virtue of the aforementioned dimensional relationships, it can be appreciated that when the structure 16 is positioned within the opening in cap 18 with the frustoconical surface 32 of the glass structure engaging the frustoconical section 48 of the cap, the bulb 30 will project outwardly beyond the end of the cap so that no bubbles in a sample solution will be entrapped about the bulb. In addition, only the more rugged glass section 28 of structure 16 will be engaged by the cap.

In assembling the ion sensitive bulb structure 16 to the salt bridge tube 12, the structure is merely inserted through the upper end of the cap so that it will seat against the frustoconical surface 48 within the cap with the bulb 30 projecting outwardly therefrom. Thereafter, preferably a sealing ring 52, formed of an elastomer or other resilient material, is positioned on top of the structure 16 so as to be in sealing engagement with the major base 34 thereof. The cap is then screw threaded upon the end 40 of the tube 12 until the upper end of the cap 46 engages the shoulder 42 on the tube. Preferably the distance between the shoulder 42 and annular end 53 of the reduced diameter section 40 of the tube and the distance between the frustoconical section 48 and upper end 46 of the cap are such that when the cap engages the shoulder 42, the sealing ring 52 is slightly compressed to ensure that no liquid which might pass between the surfaces 32 and 48 will react the salt bridge solution in tube 12.

It can be appreciated from the foregoing that there is provided by the present invention means for simply and rapidly replaceably mounting an ion sensitive bulb to the plastic salt bridge tube of an ion measuring electrode. As a consequence, if the bulb 30 of the structure 16 is accidentally broken, the electrode is not rendered useless, but the user need only to replace the structure 16 and, in a sense, a new electrode is provided without the requirement of providing a new salt bridge tube, internal half cell, cap and connector assembly. Also, the invention permits the selection by the user of the electrode of a variety of structures 16 having bulbs 30 of different compositions and configuration so that a single electrode assembly may be utilized for performing a variety of ion concentration measurements requiring different bulbs.

Reference is made to FIGS. 3A, B, C and D for an illustration of the preferred method of forming the glass structure 16. As seen in FIG. 3A, there is initially provided a glass tube 54 of a non-ion-sensitive glass, such as Corning's 0120 or 0010 lead bearing glass. As seen in FIG. 3B, the end of the tube 54 is subjected to a flame 56 to provide a tapered end section 58. Thereafter a hemispherical bulb 30 of ion sensitive glass is formed on the tapered end 58 of the tube as seen in FIG. 3C. Such bulb may be formed on the tube end 58 in the manner described in detail in the aforementioned Gilbert patent. Thereafter the tapered portion 58 is separated from the cylindrical portion of the remainder of tube 54 at the line 60 by the means of a cutting wheel or the like so as to provide the glass bulb structure 16 as seen in FIG. 3D.

A modified form of the invention is shown in FIGS. 4 and 5 wherein reference characters identical to those utilized in FIGS. 1 and 2 are employed to designate like or corresponding parts. As seen, the non-ion-sensitive section 28 of the structure 16 has a cylindrical configuration and is provided with an outwardly extending annular flange 64 intermediate the ends thereof, thereby providing a downwardly facing shoulder 66. The opening through the cap 18 includes the upper threaded section 44, which is engaged on the threaded end 40 of tube 12, an intermediate cylindrical bore 68 and a lower cylindrical bore 70 that opens at the end 50 of the cap. The bore 70 has a diameter less than that of bore 68 so as to provide therebetween an annular upwardly facing shoulder 72 which engages the shoulder 66 on the non-ion-sensitive section 28 of structure 16. Hence, upon threading of the cap on the salt bridge tube of the electrode, the structure 16 will be urged into sealing engagement with the sealing ring 52 interposed between the upper end of section 28 and the annular end 53 of tube 12.

Although the invention has herein been shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent structures and devices.

What is claimed is:

1. An ion measuring electrode comprising:
   a plastic tube for holding a salt bridge solution;
   means closing one end of said tube;
   an internal half cell positioned in said tube for contacting a salt bridge solution therein;
   a glass structure including a hollow section of relatively rugged non-ion-sensitive glass and an ion sensitive barrier fused to one end of said hollow section;
   means bearing against said hollow section for replaceably mounting said structure in sealing relationship to the other end of said tube to close the same, whereby a selected one of a variety of said structures having barriers of different glass compositions may be mounted to said tube;
   the outer surface of said hollow section having a frustoconical configuration, thereby providing at one end of said section a major base and at the other end a minor base of a diameter less than that of said major base, said hollow section being coaxial with the longitudinal axis of said tube;
   said barrier having a generally bulbous configuration and being fused to said minor base;
   said mounting means comprising a cap threadedly engaged to said other end of said tube and having an opening therein coaxial with said longitudinal axis;
   the wall of said opening having a frustoconical configuration complementary to that of said outer surface of said hollow section so that said major base is urged toward said other end of said tube upon threading of said cap thereon; and
   said barrier projecting through said opening and having a maximum diameter less than the minimum diameter of said cap opening.

2. An electrode as set forth in claim 1 wherein said barrier has a generally hemispherical configuration so that said glass structure is cup-shaped.

3. An electrode as set forth in claim 1 including annular sealing means disposed between said major base of said hollow section and said other end of said tube.

4. An ion measuring electrode comprising:
   a plastic tube for holding a salt bridge solution;
   means closing one end of said tube;
   an internal half cell positioned in said tube for contacting a salt bridge solution therein;
   a glass structure including a hollow section of relatively rugged non-ion-sensitive glass and an ion sensitive-barrier of generally bulbous configuration fused to one end of said hollow section;

a cap threadedly engaged to said other end of said tube for replaceably mounting said structure in sealing relationship to the tube to close the same, whereby a selected one of a variety of said structures having barriers of different glass compositions may be mounted on said tube;

said cap having an opening therethrough with said structure disposed therein and said barrier projecting outwardly through said opening;

said bulbous barrier having a maximum cross-section taken in the direction normal to the longitudinal axis of said tube which is less than the minimum cross-section of said cap opening; and the wall of said opening in said cap bearing against said hollow section and urging the other end thereof toward said other end of said tube upon threading of said cap thereon.

5. An electrode as set forth in claim 4 wherein:

at least a portion of the outer surface of said hollow section converges from said other end thereof toward said one end thereof; and the wall of said opening in said cap has a configuration complementary to that of said portion of said outer surface.

6. An electrode as set forth in claim 4 wherein:

the outer surface of said hollow section is shaped to provide a shoulder which faces in the direction of said barrier; and the wall of said opening in said cap embodies shoulder means engageable with said shoulder on said hollow section.

References Cited
UNITED STATES PATENTS

| | | | |
|---|---|---|---|
| 3,399,667 | 9/1968 | Nishimoto et al. | 204—195.1 |
| 3,431,182 | 3/1969 | Frant | 204—195 |
| 3,434,953 | 3/1969 | Porter et al. | 204—195.1 |
| 3,442,782 | 5/1969 | Shiller et al. | 204—195 |
| 3,445,368 | 5/1969 | Detemple | 204—195 |
| 3,463,717 | 8/1969 | Koopman et al. | 204—195 |

TA-HSUNG TUNG, Primary Examiner